July 5, 1966   J. D. BELLO-BRIDICK   3,259,005
APPARATUS FOR ROTATING A BARBECUE SPIT
Filed Oct. 9, 1964
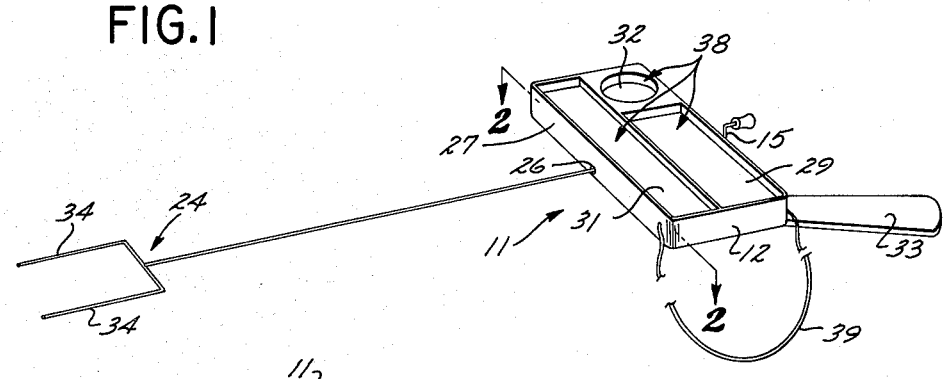
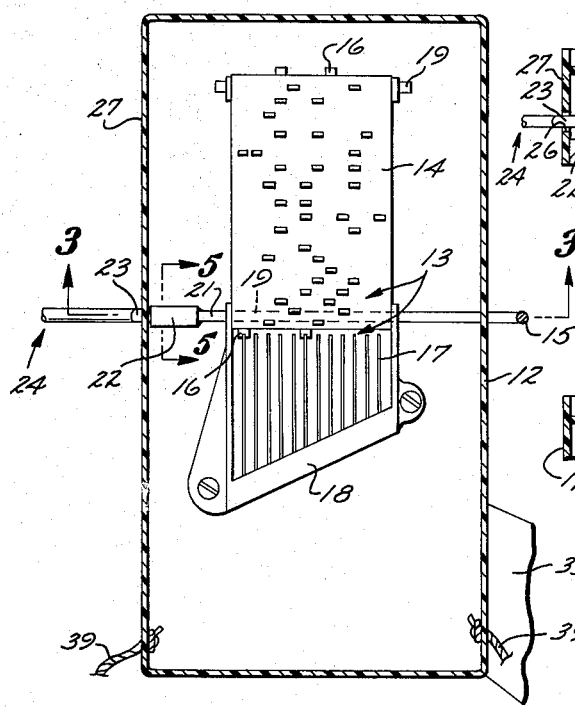
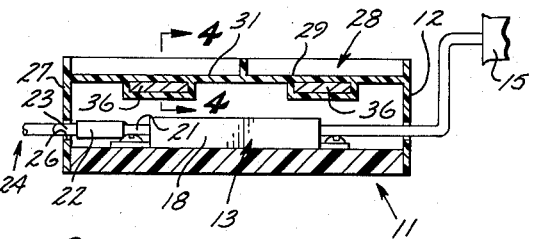
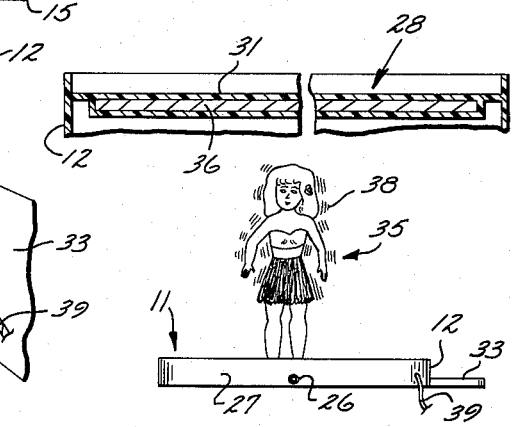
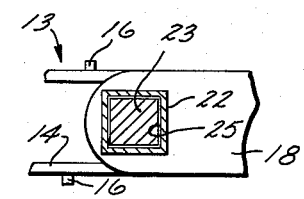
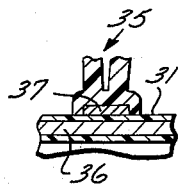
INVENTOR.
JACK D. BELLO-BRIDICK United States Patent Office 3,259,005
Patented July 5, 1966

3,259,005
APPARATUS FOR ROTATING A BARBECUE SPIT
Jack D. Bello-Bridick, 821 S. Lake, Los Angeles 57, Calif.
Filed Oct. 9, 1964, Ser. No. 402,775
1 Claim. (Cl. 84—94)

Generally speaking, the present invention relates to the barbecuing or broiling art and, more particularly, pertains to apparatus for rotating a barbecue spit intended to removably mount weiners or various meat or other food objects adapted to be barbecued (which is intended to also mean broiling herein) over a fire and which, therefore, normally requires rotation if even barbecuing of the various surfaces of the food object is to be achieved. The novel apparatus of the present invention includes music box means having a rotary portion adapted to audibly produce music as a result of rotation of said rotary portion, which is adapted to be rotated by a torque-applying crank or handle means while simultaneously, by way of a rotary output shaft and coupling means, effectively rotating a barbecue spit. Thus, it will be seen that the device may be used for rotating one or more food objects which are being barbecued and for simultaneously producing music during the rotation of the food objects being barbecued. Also, is one form of the invention, simultaneously with said rotation of the barbecue spit and music-producing operation of the music-producing means, a doll or the like may be caused to oscillate in an entertaining fashion on top of a housing carrying the music-producing means therein, or this may be done after removal of the barbecue spit when the apparatus effectively becomes a musical toy.

Also, it should be noted that, in a preferred exemplary form of the invention, the above-mentioned music-producing means is included in, and carried in, a hollow housing means whereby to effectively comprise said music box means, and said housing means has a multi-recessed upper surface portion effectively comprising serving tray means defining a plurality of downwardly directed (and usually differently shaped) serving and carrying recesses.

Furthermore, in a preferred form of the invention, the housing means is provided with outwardly extending carrying or holding handle means positioned in extended relationship with respect to the housing in a direction having a component oppositely directed from the position of the barbecue spit means whereby to facilitate holding the barbecue spit means over a source of cooking heat, such as a barbecuing or broiling open fire or the like, while enabling the hand of a person holding said handle means to be positioned as remote from said fire as possible and while also leaving the other hand of the holder of the device free for use in rotating the torque-applying crank means whereby to cause the music-producing means to produce music and whereby to simultaneously rotate the barbecue spit means over the cooking fire. Also, the handle means may be subsequently used for holding the housing means in a position such that said serving tray means defined in the upper surface thereof may be held in a convenient position for either serving others or for self-serving use such that the user can conveniently eat various food objects carried by said serving tray means.

It should also be noted that the upper surface of the serving tray means may be effectively provided, in one exemplary form thereof, with magnetic means for magnetic retention with respect to a corresponding magnetic means carried at the bottom of an auxiliary object, such as the previously mentioned doll or the like, adapted to be positioned thereabove in upstanding relationship. Said magnetic means carried by the serving tray means, or by or underneath the top wall of the housing means, may comprise a permanent magnet cooperable with either another permanent magnet or any ferromagnetic material or the functional equivalent carried at the feet of such a doll or other auxiliary object, or an effectively interchanged or reversed arrangement may be employed wherein the foot of the doll or other auxiliary object carries a permanent magnet and the upper surface of the housing means and/or the serving tray means thereof may be effectively provided with, or comprise, a suitable ferromagnetic material adapted to be attracted to the permanent magnet means carried by the foot of the auxiliary object or doll, or both elements carried by the housing means and the foot of the auxiliary object or doll may comprise permanent magnet means.

With the above points in mind, it is an object of the present invention to provide a novel apparatus for rotating a barbecue spit having the advantages referred to herein and including the features referred to herein, generically and/or specifically, and individually or in combination, and which is of relatively simple, inexpensive construction adapted for large-scale mass manufacture at very low cost whereby to be conducive to widespread use thereof.

Further objects are implicit in the detailed description which follows hereinafter (which is to be considered as exemplary of, but not specifically limiting, the present invention), and said objects will be apparent to persons skilled in the art after a careful study of the detailed description which follows hereinafter.

For the purpose of clarifying the nature of the present invention, one exemplary embodiment of the invention is illustrated in the hereinbelow-described figures of the accompanying single drawing sheet and is described in detail hereinafter.

FIG. 1 is a reduced-size three-dimensional view, partly broken away with respect to the carrying loop or strap, and illustrating the apparatus in assembled form and in mounted relationship with respect to one type of barbecue spit.

FIG. 2 is an enlarged fragmentary, partly broken away view taken substantially along the plane indicated by the arrows 2—2 of FIG. 1 immediately below the serving tray means defined in the top of the housing means of the music box and shows the music-producing means positioned therein in plan view.

FIG. 3 is a fragmentary view taken substantially in the direction of the arrows 3—3 of FIG. 2, although the upper serving tray defining portion of the housing means is included in this view.

FIG. 4 is a fragmentary view centrally broken away and broken away at the bottom, taken in the direction of the arrows 4—4 of FIG. 3.

FIG. 5 is an enlarged fragmentary cross-sectional view, taken in the direction of the arrows 5—5 of FIG. 2, and clearly illustrates the non-rotatively keyed recessed coupling member cooperable for longitudinally removable but rotatively non-movable keyed engagement with respect to a correspondingly shaped and keyed inner or rear end of the barbecue spit.

FIG. 6 is a front elevational view of the music box means of FIG. 1, with the barbecue spit removed however, and illustrates the cooperation thereof with respect to an auxiliary object comprising a doll whereby to magnetically mount the doll thereabove for oscillation simultaneous with the rotation of the manually rotatable torque-applying crank means of FIG. 1 (not shown in FIG. 6) and simultaneously with the rotation of the barbecue spit means of FIG. 1 (if it has not been removed) and with the production of music as a result of rotation of the music-producing means best shown in FIGS. 2 and 3.

FIG. 7 is a fragmentary sectional enlarged view of the foot portion of the doll of FIG. 6 illustrating its magnetic cooperation with respect to the magnetic means carried under the top of the housing means of the music box means.

Generally speaking, the exemplary form of the invention illustrated may be said to comprise music box means, generally indicated at 11, including a hollow housing 12 provided with and carrying a music-producing means, generally indicated at 13, therein and having a rotary portion 14 adapted to audibly produce music as a result of rotation thereof. The rotary portion 14 of the music-producing means 13 is effectively provided with torque-applying crank means 15 positioned outside of the housing means 12 and adapted to be forcibly manually cranked whereby to cause the music-producing means 13 to audibly produce music.

In the exemplary form of the invention illustrated, the above-mentioned rotary portion 14 of the music-producing means is shown as comprising an endless flexible belt (which may be made of rubber, plastic, or the like, although not specifically so limited) provided with a plurality of differently positioned projection elements 16 adapted to effectively pluck and vibrate any of a plurality of different cantilever tone-producing elements 17 which are of different lengths and which are fixedly mounted in the mounting structure 18.

It will be noted that the belt 14 is in the form of an endless loop mounted on two similar rotary spindle members 19, with one of said rotary spindle members 19 being coupled to the inner end of the crank 15 (in the example illustrated, actually comprising a part thereof) whereby to be rotated thereby so as to cause the different projection members 16 to pluck and vibrate different ones of the cantilever tone-producing elements 17 in the proper sequence to produce the sequential notes of a predetermined musical melody corresponding to the pattern of the projection elements 16 carried by the belt 14.

Thus, it should be noted, that the rotary portion 14 of the music-producing means 13 may be said to be effectively coupled with respect to the torque-applying crank means 15, and it should further be noted that a rotary output shaft 21 is also effectively coupled with respect thereto for rotation simultaneously with the rotation of the torque-applying crank means 15 and the rotary belt portion 14 of the music-producing means 13.

The rotary output shaft 21 is effectively provided with a non-rotatively keyed coupling member 22 cooperable for longitudinally removable but rotatively non-movable keyed engagement with respect to a correspondingly shaped and keyed engagement end 23 of a barbecue spit generally designated at 24 for rotating the barbecue spit 24 simultaneously with the rotation of the torque-applying crank means 15 and the rotary belt means 14 of the music-producing means 13.

It should be noted that, in the exemplary form of the invention illustrated, the above-mentioned coupling member 22 comprises a recessed coupling member, and the keyed feature thereof comprises the square recess 25 therein which is best shown in FIG. 5. Furthermore, in said exemplary form of the invention, the above-mentioned keyed end 23 of the barbecue spit 24 comprises a projecting or male engagement element which is of square cross section, as is best shown at 23 in FIG. 5. However, the two elements comprising the recess 25 of the coupling member 22 and the square engagement element 23 may be positionally reversed and may be modified as to cross-sectional shape, provided only that they cooperate in a relatively non-rotative manner with respect to each other and further provided that they allow the barbecue spit engagement element 23 to be withdrawn and/or removed from engagement with respect to the coupling member 22 by way of the aperture means 26 in the housing side wall 27. This makes it possible to engage and disengage the barbecue spit 24 with respect to the torque-applying coupling member 22. This is desirable when the device is to be stored or is to be transported and is also desirable after completion of a barbecuing operation when the upper surface of the housing 12 of the music box means 11 is to be used as a serving tray means, as will be referred to hereinafter, or when the device is to be used just as a musical toy, as will also be referred to hereinafter.

In the exemplary form of the invention illustrated, the housing means 12 has a multi-recessed upper surface portion effectively comprising serving tray means, generally designated at 28, defining a plurality of downwardly directed (and usually differently shaped) serving and carrying recesses such as shown at 29, 31, and 32. In the form illustrated, said recesses 29–32 are formed in the top wall of the housing means 12 such as by molding, stamping, or other suitable forming operation, and are shown as comprising differently shaped recesses suitable for carrying different types of food, with one of them, the recess designated at 32, being suitable for carrying the base of a glass or cup or the like. However, it should be clearly noted that said recesses may be modified as to number, shape, relative positioning, etc., within the broad scope of the present invention, which is not specifically limited to the exact structural arrangement illustrated with respect thereto.

The above-mentioned serving tray means feature of the invention makes it possible to remove the barbecue spit 24 and by means of the handle 33 to use the serving tray means 28 for serving various individuals or for serving oneself while eating various food objects carried by the serving tray means 28. In this connection, it should be noted that the handle means 33 preferably extending angularly outwardly from one corner of the housing means 12 and in a direction having a component oppositely directed from the position of the barbecue spit means 24 whereby to place the holding hand of a person grasping the handle means 33 as remote as possible from a barbecuing fire or other source of heat adapted to be positioned under or closely adjacent to the tine portions 34 of the barbecue spit means 24.

If desired, in certain forms of the invention, as illustrated in FIGS. 3, 4, 6, and 7, the upper surface of the housing means 12, such as under the serving tray means 28, as best shown in FIGS. 3 and 4, may be effectively provided with magnetic means adapted for use in magnetically retaining corresponding magnetic means carried at the bottom of one or more auxiliary objects adapted to be positioned thereover in upstanding relationship, such as the auxiliary doll generally designated at 35 in FIG. 6 (and fragmentarily shown in FIG. 7), although not specifically so limited.

In the exemplary illustrated form of this version of the invention, the magnetic means is illustrated as comprising two longitudinal permanent magnets 36 carried under the serving tray means 28 in a manner such that a corresponding magnetic means such as the ferro-magnetic member shown at 37 in FIG. 7 as being carried at the foot of the auxiliary object comprising the doll 35, will be adapted to be magnetically retained so as to positively hold the doll 35 in upstanding relationship above the top of the housing means 12 in the manner best shown in FIG. 6.

Of course, it should be understood that the permanent magnets 36 may be modified to merely comprise ferro-magnetic means, in which case the magnetic means 37 carried at the foot of the doll 35 may comprise permanent magnet means, or both of the magnetic means 36 and 37 may comprise permanent magnet means. The main object of the arrangement is to provide for positive magnetic retention of the doll 35 in upstanding relationship such as shown in FIG. 6. This may be with respect to one or more dolls or other types of auxiliary objects.

In the case of the doll shown at 35, it may be of the type wherein only the lower portion of the doll is firmly positioned (by way of the magnetic retention described above), with the upper portion of the doll being movably balanced upon and resiliently center positioned with respect to the lower portion of the doll by interior balancing and biasing spring means (of a type well known in the art in such dolls and, therefore, not shown in detail herein). Such an arrangement means that every slight movement of the housing means 12, such as would be provided in response to rotating the torque-applying crank 15, will cause the upper portions of the doll 35 to oscillate and vibrate in the manner indicated at 38 in FIG. 6, thus providing a very entertaining spectacle in correpsondence with the production of music by the music-producing means 13 and apparently dancing in synchronism therewith and both of these operations continuing as long as the crank 15 (and, in some cases as long as the barbecue spit 24) is rotated.

The carrying cord (or strap) shown fragmentarily at 39 in FIGS. 1, 2, and 6 may be used for positioning and/or carrying the device by merely looping it around the neck and one shoulder of a person.

Various portions of the housing means are preferably made of heat-resistant molded plastic material, although not specifically so limited in all forms of the invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

Music box means including hollow housing means provided with and carrying music-producing means therein having a rotary portion adapted to audibly produce music as a result of rotation of said rotary portion thereof, said rotary portion of said music-producing means being effectively provided with torque-applying means positioned outside of said housing means for the forcible manual rotation thereof whereby to cause said music-producing means to audibly produce music; and rotary output means effectively connected with respect to said torque-applying means for rotation simultaneously with rotation thereof and with the production of music by said music-producing means, said output means being effectively provided with a coupling member cooperable for longitudinally removable but rotatively non-movable engagement with respect to a correspondingly shaped engagement end of a barbecue spit means for rotating such a barbecue spit means simultaneously with the rotation of said torque-applying means, said rotary portion of said music-producing means, and with the production of music thereby, said coupling member being positioned within one side wall of said housing means, which is provided with aperture means aligned therewith, for facilitating engagement and disengagement of said coupling member with respect to a correspondingly shaped engagement end of a barbecue spit means, said housing means being provided with carrying handle means extending outwardly therefrom in a direction having a component oppositely directed from the position of said coupling member, said housing means being provided with a multi-recessed upper surface portion effectively comprising serving tray means defining a plurality of downwardly directed serving and carrying recesses, said upper surface portion of said housing means being further effectively provided with permanent magnet means for magnetic retention with respect to a corresponding magnetic means adapted to be carried at the bottom of an auxiliary doll adapted to be positioned thereabove in upstanding relationship.

References Cited by the Examiner

UNITED STATES PATENTS

| | | | |
|---|---|---|---|
| 2,501,022 | 3/1950 | Boyle | 84—95 X |
| 2,705,387 | 4/1955 | Handler et al. | 46—118 |
| 2,813,446 | 11/1957 | Botnick | 84—95 |
| 3,006,111 | 10/1961 | Koch | 84—95 X |
| 3,013,550 | 12/1961 | Murchie | 99—421 X |
| 3,019,720 | 2/1962 | Topper | 99—421 X |
| 3,120,718 | 2/1964 | Glass et al. | 46—14 |

LOUIS J. CAPOZI, *Primary Examiner.*

BILLY J. WILHITE, *Examiner.*